United States Patent [19]

Neese

[11] Patent Number: 4,522,516
[45] Date of Patent: Jun. 11, 1985

[54] ROLLER BEARING SUPPORT STRUCTURE WITH METAL WINDOW CAGE

[75] Inventor: Gerhard Neese, Schonungen, Fed. Rep. of Germany

[73] Assignee: FAG Kugelfischer Georg Schafer, Kommanditgesellschaft auf Aktien, Fed. Rep. of Germany

[21] Appl. No.: 567,230

[22] Filed: Dec. 30, 1983

Related U.S. Application Data

[63] Continuation-in-part of Ser. No. 312,818, Oct. 19, 1981, abandoned.

[30] Foreign Application Priority Data

Nov. 3, 1980 [EP] European Pat. Off. ........ 80106739.8

[51] Int. Cl.$^3$ .............................................. F16C 33/48
[52] U.S. Cl. .................................... 384/572; 384/575
[58] Field of Search .................. 308/201, 207 R, 217, 308/218, 235

[56] References Cited

U.S. PATENT DOCUMENTS

| | | | |
|---|---|---|---|
| 1,144,451 | 6/1915 | Vanderbeek | 308/214 |
| 2,705,176 | 3/1955 | Palmgren | 308/217 |
| 3,022,125 | 2/1962 | Bratt et al. | 308/217 |
| 4,199,203 | 4/1980 | Pearson | 308/217 X |
| 4,280,743 | 7/1981 | Fernlund | 308/217 |

FOREIGN PATENT DOCUMENTS

| | | |
|---|---|---|
| 848125 | 9/1952 | Fed. Rep. of Germany . |
| 1002993 | 2/1957 | Fed. Rep. of Germany . |
| 1790657 | 3/1959 | Fed. Rep. of Germany . |
| 1935798 | 2/1966 | Fed. Rep. of Germany . |
| 483625 | 4/1938 | United Kingdom . |

*Primary Examiner*—Stuart S. Levy
*Assistant Examiner*—David Werner
*Attorney, Agent, or Firm*—Ostrolenk, Faber, Gerb & Soffen

[57] ABSTRACT

A roller bearing comprising an annular outer track and a roller cage for positioning shoulderless, self-aligning roller bearings for high loads is disclosed. The cage is a window cage. It supports two annular rows of bearing rollers so that the inner end surfaces of the rollers are almost in engagement with each other. The cage is circular, but is elastically deformable for insertion in the bearing. The axially inner cage ring part between the two rows of rollers extends parallel to the race of the outer ring and lies practically against it. Over the entire circumference and across the entire width of the inner cage ring part, its outer surface is provided with spaced apart indentations which may include lubricant in them. The axially outer cage ring parts extend radially to the inner bearing race ring. The cage is preferably made of a hardened but elastic steel plate and is a single piece for at least one of the annular rows of rollers.

4 Claims, 7 Drawing Figures

ROLLER BEARING SUPPORT STRUCTURE WITH METAL WINDOW CAGE

RELATED APPLICATION

This is a continuation-in-part of copending application. Ser. No. 312,818, filed Oct. 19, 1981, in the name of Gerhard Neese now abandoned.

BACKGROUND OF THE INVENTION

The present invention relates to roller bearing structures and means for supporting and spacing the roller bearings with respect to each other. More specifically, the present invention relates to a metal window cage for shoulderless self-aligning roller bearings which are capable of carrying high loads and in which the inner end surfaces of the rollers are almost in engagement with each other.

Cages for self-aligning bearings are known which have an H-shaped cross-section, as seen in German Utility Model Gm 17 90 657. Such a cage supports two annular rows of bearing rollers. The two halves of the cage in such a bearing rest against each other with clearance at their rear or inner, i.e. their adjacent, surfaces. The cages are also provided with circumferential radially outer surfaces, which are shaped to correspond to the raceway of the outer bearing ring and have clearance from the outer ring.

Such cages, however, cannot advantageously be used in connection with self-aligning roller bearings which are to carry high loads and in which the inner end surfaces of the rollers in the two rows are, for all practical purposes, virtually in engagement with each other. This is so because the adjacent rear surfaces of the cage halves require too much space axially and this space is not present in bearings of the aforementioned type of the invention.

In the prior art, an additional disadvantage arises in that the rear surfaces of the cage do not permit elastic radial deformation of the cage which is required in order to insert the cage into the bearing. The radially extending rear surfaces tend to stiffen the cage and permit only a slight variation from the true round condition to a slightly oval condition. This slight variation is, however, not sufficient for introducing the cage by slight elastic deformation through the smallest outer ring diameter.

The cage deformation method of mounting is possible with a cage made in accordance with British Pat. No. 483,625. But, with a collar-like cage of that type, because the cage webs, which engage the sides of the rollers, lie far outside the pitch circle, there is the danger that the rollers are not sufficiently restrained axially and radially and may run onto the cage webs. In addition, the bearing shown in British Pat. No. 483,625 is not the type of bearing to which the present invention is directed.

In U.S. Pat. No. 1,144,451, after insertion of the rollers, one side of the cage edge of the tapered roller bearing cage is provided with indentations which hold the cage in the bearing and form a single structural unit. The indentation of the side edge of the cage is not only expensive in assembly, but it also is not possible to make such indentation when the cage is made of hardened material or cannot be indented with sufficient precision. In addition, the bearing of U.S. Pat. No. 1,144,451 is not of the same type as the bearing to which the present invention is directed.

SUMMARY OF THE INVENTION

The primary object of the present invention is to provide a cage for self-aligning roller bearings intended for high loads, which cage does not have the disadvantages above referred to.

Despite constricted space conditions, the present invention makes it possible to guide the rollers axially and radially in a highly dependable manner and free of momentum and to prevent the rollers from running onto the cage webs, as well as to properly support the cage on the outer bearing ring of the bearing raceway and to introduce the cage into the bearing in a simplified fashion.

The cage of the invention carries annular rows of bearing rollers in which the inner roller end surfaces of the two rows are, for practical purposes, virtually in engagement with each other. The cage is formed as a single part for at least one annular row of rollers. There may be two adjacent, coaxial cages for the two rows of rollers or there may be one unitary cage for holding the two rows of rollers. The cage is developed so as to be two elastically deformable. While the cage may be made of hardened steel plate, it has sufficient elastically deformable characteristics to permit it to be deformed to be introduced into the bearing. Thereafter, the cage will elastically restore itself. The inner cage ring part between the rows of rollers extends parallel to the race of the outer bearing ring and rests practically against that race and is provided with spaced indentations on its radially outer diameter or circumference, preferably over the entire width of the inner cage ring, in order further to position the rollers. The outer cage ring part extends radially toward the inner ring of the bearing.

Utilizing the cage of the present invention, it has become possible for the indentations of the inner cage ring part to contribute to a multi-surface guiding arrangement of the cage on the outer bearing ring. This is advantageous from the standpoint of lubricating techniques. In addition, owing to these identations, the amount by which the cage must be elastically deformed in order to enable its introduction into the outer ring is reduced. The indentations increase the surfaces on the end side of the rollers and improve the lateral guidance thereof.

The foregoing and many other objects of the present invention will become apparent in the following description taken in connection with the accompanying drawings.

DESCRIPTION OF THE PREFERRED EMBODIMENTS

Figure 1:
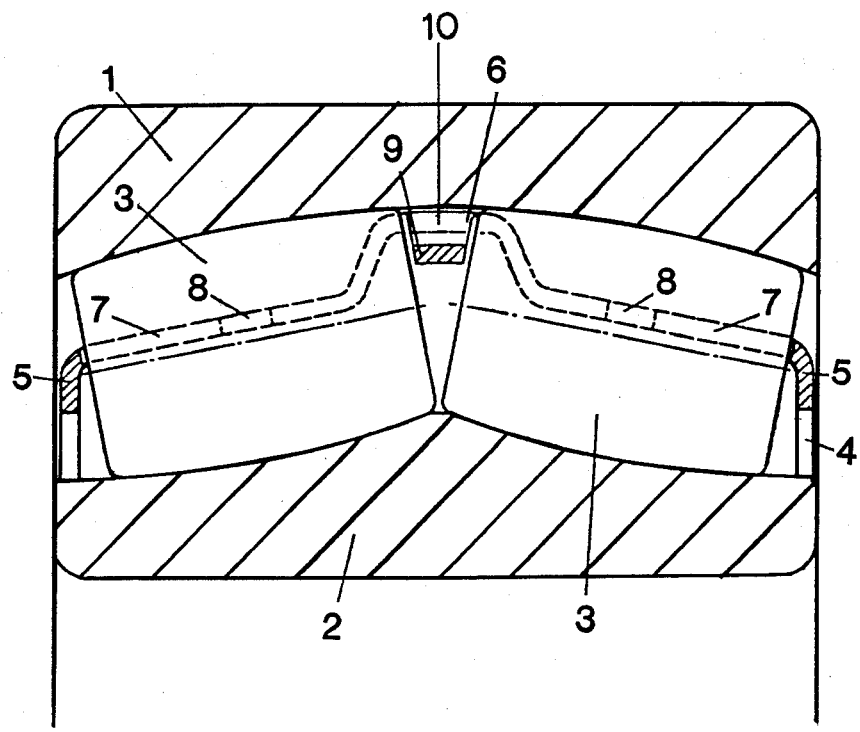
FIG. 1 is a partial cross-sectional view through a two-row, self-aligning roller bearing having a unitary cage.

Referring to FIG. 1, the self-aligning roller bearing includes an outer ring 1 that is spaced from an inner ring 2. The rollers 3 are arranged between the outer ring 1 and the inner ring 2. Rings 1 and 2 are held in appropriately spaced condition by the unitary cage structure 4 which in this embodiment extends axially across the whole bearing. The cage 4 is provided with two-cage ring parts 5 on its exterior sides and also has a cage ring part 6 at the interior between the two rollers 3. The ring part 6 extends parallel to the race of the outer ring 1 and rests practically against that race.

Webs 7 are provided between parts 5 and 6. They extend across the spaces between circumferentially adjacent rollers in an annular array thereof. The webs 7 may also include holding projections 8 for the rollers 3. The inside cage ring part 6 has a plurality of circumferentially spaced apart indentations 9 arrayed around the radially exterior side of its entire circumference and over its entire width. These indentations provide multi-surface guidance for the cage 4 and the outer ring 1. This is a special advantage from a lubricating standpoint since wedges of lubricant can thereby be developed in the indentations.

Figure 2:
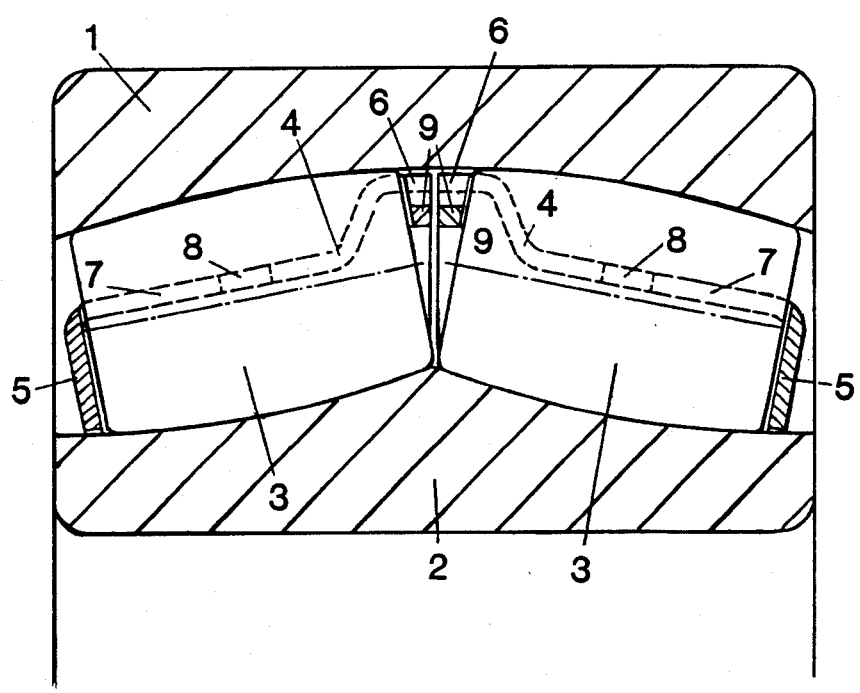
FIG. 2 is a partial cross-sectional view through a two-row, self-aligning roller bearing having a unitary cage for each row of rollers.

Referring now to FIG. 2, a self-aligning roller bearing is shown in which each of the two annular rows of rollers is provided with a respective unitary cage 4. In this embodiment, also, each cage is comprised of an exterior cage ring part 5, an inside cage ring part 6, and a web 7 with the holding projections 8 for the rollers 3 developed on the web 7. In this embodiment, the exterior cage ring parts 5 can extend radially up to practically the race of the inner ring 2, which results in better guidance of the cage. The foregoing is possible only on one side in the embodiment of FIG. 1 since, during mounting, the cage must be pushed over the largest diameter of the inner ring 2. The indentations 9 of the inside cage ring section 6 facilitate the introduction of the cage into the outer ring 1 as mentioned above, since they reduce the amount of distortion which is required for such insertion.

Figure 3:
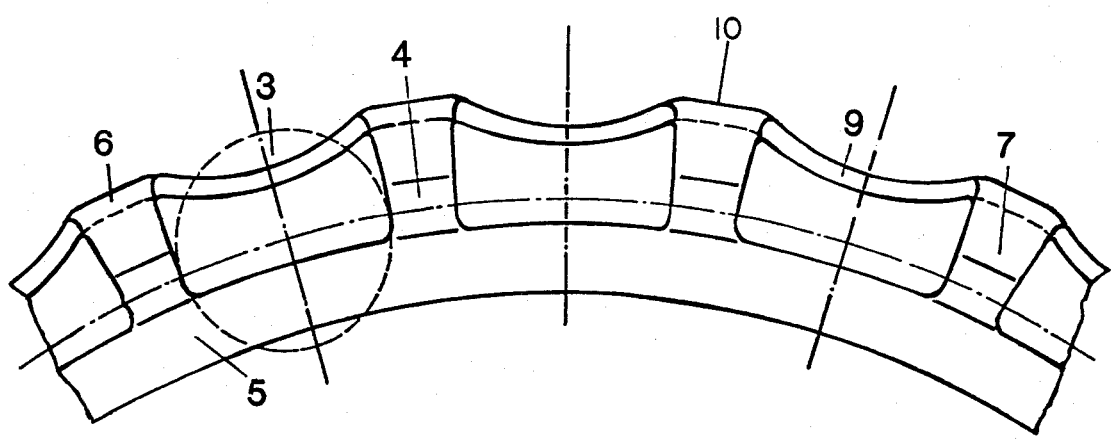
FIG. 3 is a portion of a front view of a self-aligning roller bearing cage with indentations in accordance with the present invention.

The indentations 9 can be more clearly seen in FIG. 3, where it is also possible to observe how the engagement between the abutment surface 4 and the end of the roller 3 is increased. For this reason, it is also desirable to provide one indentation in the region of each pocket. However, it would be sufficient, in order to facilitate assembly of the bearing, to provide only two opposite indentations.

Figure 4:
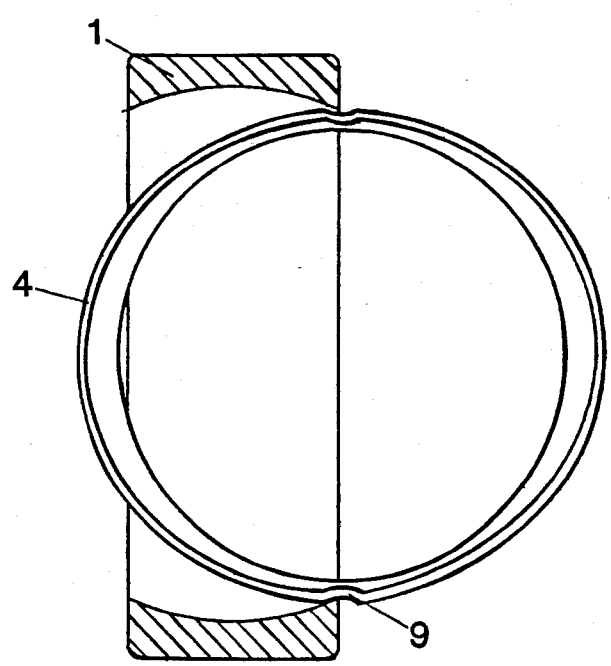
FIG. 4 is a view of a self-aligning roller bearing outer ring with a cage made in accordance with the present invention, showing the elastic deformation thereof during the introduction of the cage into the bearing.

FIG. 4 has been included to show the introduction of the cage 4 into the outer ring 1. For this purpose, an indentation 9 of the cage 4 is located, oriented 90° initially out of the plane of the outer ring and on the outer edge of the outer ring 1, and the cage is elastically deformed. Due to the radially extending exterior cage ring parts 5, there is obtained thereby a spring effect which brings the cage back into its initial shape when the cage has been introduced into the race. The inner ring, which is also introduced at the same time into the outer ring, is swung back together with the cage and the rollers by an angle of 90° into the plane of the bearing after the rollers have been inserted, and the bearing is then completely assembled.

Figure 5:
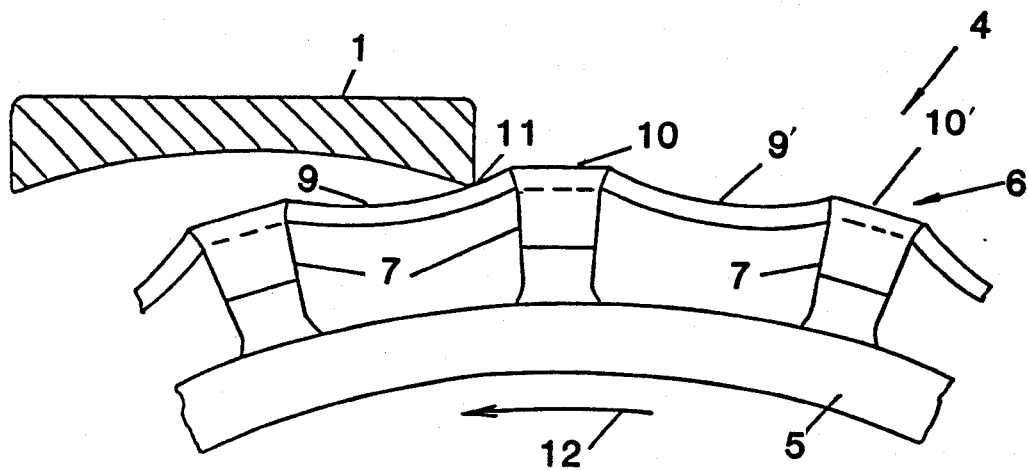
FIGS. 5, 6 and 7 are detailed views illustrating the manner in which the roller bearing cage is placed into the outer ring.
Figure 6:
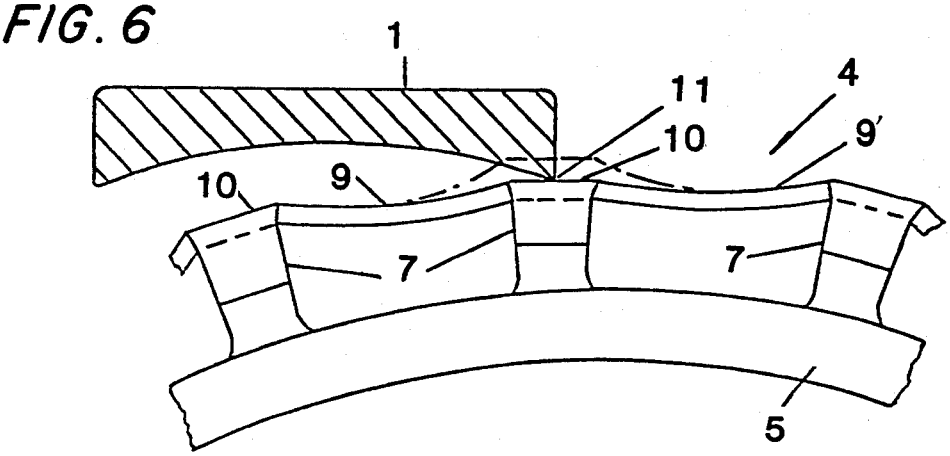
Figure 7:
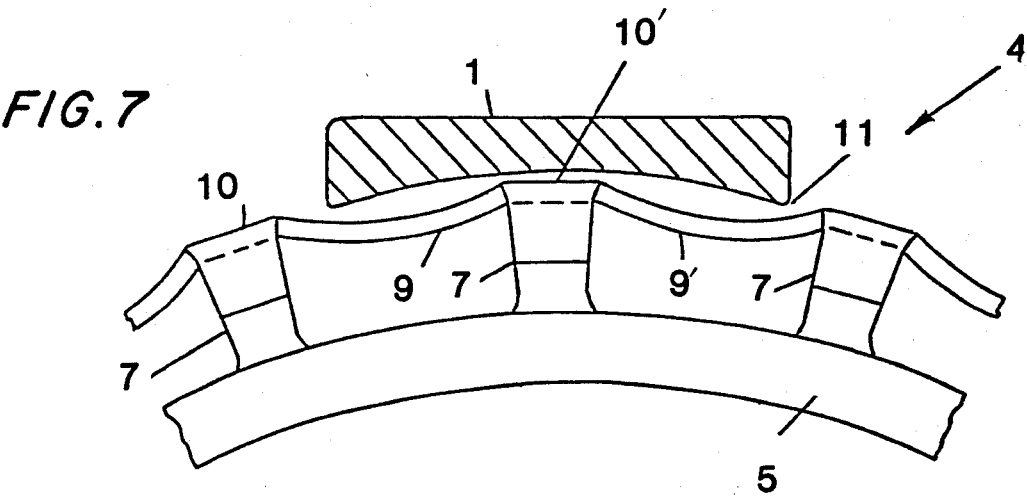

A detail of the manner in which the cage 4 is deformed from being placed within the outer ring 1 is illustrated in FIGS. 5-7.

FIG. 5 corresponds to the position of the cage 4 illustrated in FIG. 4. In this position, the cage 4 is substantially in an unstressed condition. The land 10 defined at the junction between adjacent indentations 9 and 9' and adjacent axial webs 7 is located radially outward of the radially innermost portion 11 of the outer ring 1. In order to place the cage 4 fully within the outer ring 1, the cage 4 is rotated counterclockwise as illustrated in FIG. 5 as indicated by the arrow 12. As the cage 4 is rotated, the contact between the indentation 9 and the radially inward portion 11 of the ring 1 causes the ring part 6 of the cage 4 to deform the area of the land 10 so as to permit the land 10 to compress below its unstressed position illustrated in phantom in FIG. 6. Due to the circular configuration of the exterior cage ring parts 5 and the scalloped configuration of the inside cage ring part 6, the inside cage ring part 6 deforms before the outside cage ring parts 5. As the cage 4 is further rotated in the counterclockwise direction, the radially innermost portion 11 of the ring 1 will ultimately enter the next indentation 9' as shown in FIG. 7 at which point the cage 4 is fully within the ring 1. If the diameter of the radially inward portion 11 of the ring 1 is sufficiently small, the entire cage 4 must be bent into an oval shape by applying sufficient pressure thereto. It is significant, however, that the inside cage ring part 6 will deform significantly before the outside cage ring parts 5 so as to simplify the insertion of the cage 4 into the ring 1 and so as to enable the overall cage structure to be more solid than would otherwise be possible.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A metal window cage for the bearing rollers in a double row shoulderless, spherical roller bearing, wherein the bearing includes two annular rows of rollers having axially inwardly facing surfaces which are nearly in contact, an inner ring with a respective radially outwardly facing inner raceway for each of the rows of rollers, and an outer ring with a radially inwardly facing outer raceway facing toward and radially spaced from the inner raceway; the rollers being in rolling contact with the outer and the respective raceways;

the cage being comprised of an elastically deformable hardened metal; the cage comprising an inboard cage ring disposed between the axially inwardly facing surfaces of the rows of rollers; the inboard cage ring extending around the outer raceway and being positioned to run parallel to the outer raceway; the inboard cage ring having an outwardly facing external surface which is positioned nearly in contact with the outer ring raceway; the external surface of the inboard cage ring being generally scalloped to define a series of depressions extending around the inboard cage ring at spaced intervals, with each depression being at a respective pair of the rollers located at opposite sides of the inboard cage ring, and each depression extending across the whole axial width of the inboard cage ring;

the cage further comprising two outboard cage rings, each axially outboard of one of the two rows of rollers, and the outboard cage rings extending radially inwardly toward the inner ring;

the cage further comprising cross pieces which connect the inboard and outboard cage rings; cross pieces being disposed circumferentially around the cage at intervals for spacing rollers apart around the cage.

2. The cage of claim 1, wherein each of the inboard and outboard cage rings is elastically deformable generally to an oval shape to facilitate insertion of the cage in the outer ring.

3. The cage of claim 1 wherein said window cage is formed of hardened steel plate.

4. A roller bearing, comprising:

an outer ring having a radially inwardly facing outer raceway; an inner ring located radially inward of the outer ring and having a respective radially outwardly facing inner raceway for a row of rollers, and being spaced from the outer raceway; two parallel rows of spherical rollers disposed between the inner and outer rings and riding on their respective inner and outer raceways; and a cage being comprised of an elastically deformable hardened metal; the cage comprising an inboard cage ring disposed between the axially inwardly facing surfaces of the rows of rollers; the inboard cage ring extending around the outer raceway and being positioned to run parallel to the outer raceway; the inboard cage ring having an outwardly facing external surface which is positioned nearly in contact with the outer ring raceway; the external surface of the inboard cage ring being generally scalloped to define a series of depressions extending around the inboard cage ring at spaced intervals, with each depression being at a respective pair of the rollers located at opposite sides of the inboard cage ring, and each depression extending across the whole axial width of the inboard cage ring;

the cage further comprising two outboard cage rings, each axially outboard of one of the two rows of rollers, and the outboard cage rings extending radially inwardly toward the inner ring;

the cage further comprising cross pieces which connect the inboard and outboard cage rings; cross pieces being disposed circumferentially around the cage at intervals for spacing rollers apart around the cage.

* * * * *